United States Patent Office

3,395,019
Patented July 30, 1968

3,395,019
PREPARATION OF ANIMAL FEED
FROM OAT HULLS
Boris Kviesitis and Willard E. Rogerson, Des Moines,
Iowa, assignors to Vylactos Laboratories, Inc., Des
Moines, Iowa, a corporation of Iowa
No Drawing. Continuation-in-part of applications Ser. No.
154,895, Nov. 24, 1961, and Ser. No. 342,219, Feb. 3,
1964. This application Oct. 18, 1965, Ser. No. 497,470
13 Claims. (Cl. 99—2)

ABSTRACT OF THE DISCLOSURE

The process of preparing an animal feed wherein ground oat hulls are mixed with water and a treating substance is added thereto. The mass is then baked to modify its starch and protein characteristics to dry the same and to expand the pores of the material. A water and molasses solution is then mixed into the baked mass and the mass is then dried.

---

This application is a continuation-in-part of the original application, Ser. No. 154,895 under the filing date of Nov. 24, 1961, and application Ser. No. 342,219 under the filing date of Feb. 3, 1964, both said applications now abandoned.

The nutritional value of cane, beets, corn, citrus, molasses, fish solubles and like is general recognized. However, such materials in their liquid form are most difficult to package, handle, or mix with other feeds. Obviously, a liquid such as molasses has objectionable sticking and adhesive characteristics that in some cases render it unusable without treatment. Also, in the feeding of a material such as molasses, it is common practice to use it in a mixture with some other dry feed ingredients. Some of these dry feed ingredients could be successfully used as carriers or fillers in the processing of molasses or other liquid products to a dry free-flowing form. One such carrier for molasses or like would be oat hulls. The choice of oat hulls as the carrier is especially desirable due to the fact that oat hulls usually are available on market at an inexpensive price and could be properly incorporated in almost any kind of livestock feed without a harmful result. Oat hulls are available on the market in different grades such as oat clippings, oat middlings, oat mill feed and oat hulls. The difficulty, however, in using oat hulls is that they are rather slick texture in their natural state and therefore do not properly receive and absorb the molasses or like.

Therefore one of the principal objects of our invention is to so treat and/or process oat hulls so that they will successfully absorb and retain such materials as molasses, fish solubles, and like.

Still further objects, features and advantages of this invention will be apparent to those skilled in the art and especially in view of the following description:

As before indicated, the first step is the proper processing of the oat hulls. Commercial grades of oat hull products are composed of protein, fat, fiber, nitrogen-free extract (including starch) and ash. It is desirable to expand the pores of oat hull fibers to improve its absorption properties. And it also is desirable to change the adhesive nature of protein and starch present in oat hulls, which are the main interfering factors in hot aqueous absorption process.

The oat hulls are first ground into a relatively fine state, for example, to the particle size of less than Tyler mesh No. 14. Next, water is added to the ground oat hulls. The permissible range of water added to the oat hulls is fifty percent (50%) to seventy-five percent (75%) by weight. The preferred range is fifty-five percent (55%) to seventy percent (70%) by weight. The best ratio is sixty percent (60%) by weight. The oat hull-water mixture is then mixed in a conventional ribbon type or paddle type mixer. The permissible mixing time is 5 to 25 minutes, while the preferred mixing time is 7 to 23 minutes. However, the best time of mixing the water-oat hull mixture is 10 to 20 minutes. The temperature of the oat hull-water mixture is then adjusted by means of steam or hot water. The permissible adjusted temperature of the oat hull-water mixture is 50 to 100 degrees F., while the preferred temperature is 60 to 90 degrees F. However, the best adjusted temperature of the oat hull-water mixture is 70 to 80 degrees F. At this stage of the process, in order to produce a suitable feed, it is important to add a quantity of alkalies such as calcium or sodium hydroxides; carbonates, such as calcium carbonates; yeast, such as of the genus Saccharomyces or of the genus Torula; or enzymes such as catalase, cellulase and amylase. The permissible amount added is .3% to 2.7% by weight with a preferred range of .5% to 2.5% by weight. The best amount to be added is 2.0%.

The next step is the mixing of the water-oat hull mass by any convenient method for approximately one hour, wherein the temperature of the mixture is maintained at permissible range of 65 to 90 degrees F. The preferred temperature is 70 to 85 degrees F. and the best temperature is 80 degrees F. The mass is then baked to modify the protein and the starch in the oat hulls; to dry the mass, and to expand the pores of the material. An ordinary rotary kiln may be used for this baking phase and the permissible temperature range of such baking is from 230 to 320 degrees F. while the preferred range is from 240 to 310 degrees F. while the best baking temperature is 250 to 300 degrees F. The mass is baked for a period of 30 to 45 minutes, depending upon the baking temperature being used. If the baked resultant mass has agglomerated into lumps and clusters during the baking process, it should be again ground so as to receive the molasses or like.

The next step in the process is to mix the treated oat hulls with water and molasses. The amount of water and molasses added to an amount of baked oat hulls depends upon the desired sugar content of the finished product. For example, 1,200 pounds of feed grade cane molasses may be added to 500 pounds of water and the resultant mixture added to approximately 1,160 pounds of baked oat hulls. The final product will be approximately 2,000 pounds of dried finished product having a sugar content of approximately 29.0%. As a further example, 1,800 pounds of feed grade molasses may be mixed with 700 pounds of water and the resultant mixture added to 7,450 pounds of baked oat hulls. The final product will be approximately 2,000 pounds of dried finished product having a sugar content of approximately 43.0%. The best finished product will be achieved when the water and molasses are mixed together and heated to approximately 180 degrees F. before they are introduced to the treated oat hulls. The next step in the process is the mixing of the mass by any convenient method for a period of time (usually 20 minutes) to permit the successful absorption of the molasses or like into the oat hulls.

The last step is the placement of the mixed mass into a drying means such as a rotary drier. In the drying method used, hot air having a temperature of 500 to 700 degrees F. was introduced in the input end of the drier. The outlet temperature of the air was approximately 240 to 300 degrees F. The mixed mass usually requires 30–60 minutes of drying time. The final finished product emerges from the rotary drier with a temperature of below 140 degrees F. and a moisture content of .5–5.0%.

The finished product coming from a drier will not be of a sticky nature, but may be easily handled, packaged, stored, transported, and mixed with other stock feed. Although molasses has been mainly referred to, obviously fish press water, fish solubles and the like may be substituted for the molasses when desired.

EXAMPLE OF ONE BATCH

A quality of oat hulls was ground to a particle size of less than Tyler mesh No. 14. Water was then added to the ground oat hulls at a ratio of 60 percent by weight. The ground oat hull-water mixture was then mixed in a conventional ribbon type mixer for approximately 10–20 minutes. The temperature of the mixture was then adjusted to approximately 75 degrees F. A yeast starter was prepared by mixing one pound of compressed yeast of Saccharomyces cerevisiae with two quarts of water and one pint of cane molasses and was propagated for four hours at approximately 80 degrees F. The yeast starter was then added to the oat hull-water mixture at the ratio of one pound of compressed yeast to 500 pounds of oat hulls and thoroughly mixed. This mixture was maintained at a temperature of 80 degrees F. for approximately one hour (preferred range of temperature being 70–85 degrees F. with best results being obtained at 80 degrees F.). The mixture was then baked and dried in an ordinary rotary kiln at a temperature of 250 to 300 degrees F. for a period of 30 to 45 minutes. The yeast is deactivated by the baking and drying. However, prior to such baking and drying, the yeast changes or modifies the oat hulls in several ways, among them being: (1) the formation of alcohol and carbonate deoxide; (2) the production of soluble carbohydrates such as sugars and dextrins from insoluble forms of starch; (3) the production of various organic acids such as lactic, acetic and at times butyric; (4) a partial solution of the protein compounds; and (5) the formation of amid and ammonium compounds from insoluble protein. All of these changes are due mainly to the enzymes produced by the yeast. All of these changes improve the absorption capacity of the oat hulls and improve the palatability of the finished product prepared from treated oat hulls and cane molasses. Enzymes may be substituted for the yeast and will produce changes 2–5 above. The treated oat hulls were then mixed with water and molasses as previously described and produced a highly desirable finished product.

Thus from the foregoing it is seen that the invention will accomplish at least all of its stated objectives.

Some changes may be made in the construction and arrangement of our Animal Feed and Process for Producing Same without departing from the real spirit and purpose of our invention, and it is our intention to cover by our claims, any modified forms of structure or use of mechanical equivalents which may be reasonably included within their scope.

We claim:

1. The process of preparing an animal feed, comprising,
    the taking of a mass of oat hulls,
    the grinding of the oat hulls,
    the mixing of the oat hulls and water for a predetermined period of time,
    adjusting the temperature of the oat hull-water mixture to 50 to 100 degrees F.,
    adding and mixing a quantity of yeast to the oat hull-water mixture,
    mixing the yeast oat hull-water mixture for approximately one hour while maintaining the temperature thereof in the range of 65–90 degrees F.,
    the baking of the yeast-oat hull-water mixture,
    the mixing of a water and molasses solution into the mass
    mixing the mass for approximately 20 minutes, and
    the drying of the mass in a dryer.

2. The process of claim 1 wherein a fish derivative is substituted for the molasses.

3. The process of preparing an animal feed, comprising,
    the taking of a mass of oat hulls,
    the grinding of the oat hulls,
    the adding of water to the mass,
    the mixing of the oat hulls and water,
    adjusting the temperature of the oat hull-water mixture to 50 to 100 degrees F.,
    adding and mixing a quantity of yeast to the oat hull-water mixture,
    mixing the yeast-oat hull-water mixture for approximately an hour while maintaining the temperature thereof in the range of 65–90 degrees F.,
    the baking of the mass to modify its starch and protein characteristics, to dry the same and to expand the pores of the material,
    the mixing of a water and molasses solution into the mass, and
    mixing the mass for approximately 20 minutes,
    lastly, the drying of the mass in a dryer until the mass has a moisture content of .5–5.0 percent.

4. The process of preparing an animal feed, comprising,
    the taking of a mass of oat hulls,
    the grinding of the oat hulls,
    the adding of water to the oat hulls and mixing the same,
    adjusting the temperature of the oat hull-water mixture to 50 to 100 degrees F.,
    adding and mixing a quantity of yeast to the oat hull-water mixture,
    mixing the yeast-oat hull-water mixture for approximately an hour while maintaining the temperature thereof in the range of 65–90 degrees F.,
    the baking of the mass to modify its starch and protein characteristics, to dry the same and to expand the pores of the material, said baking to be at a temperature of 230°–320° F. for a period of 30 to 45 minutes,
    the mixing of a water and molasses solution into the mass and mixing the mass for approximately 20 minutes, and
    lastly, the drying of the mass in a dryer until the mass has a moisture content of .5–5.0 percent.

5. The process of preparing an animal feed, comprising,
    grinding oat hulls into a fine state;
    mixing water in a ratio of 50 to 75 percent by weight to the ground oat hulls;
    adjusting the temperature of the oat hull-water mixture to 50 to 100 degrees F.,
    adding yeast in a ratio of from .3 to 2.5 percent by weight to the oat hull-water mixture;
    mixing the oat hull-water-yeast mixture for approximately one hour while maintaining the temperature thereof in the range of 65–90 degrees F.,
    baking the oat hull-water-yeast mixture at a temperature range of 230° to 320° F. for approximately 30 to 45 minutes;
    mixing the baked mixture with a preheated and premixed water and molasses mixture;
    stirring the entire mass for approximately 20 minutes; and drying the stirred mass.

6. The process of preparing an animal feed, comprising,
    grinding oat hulls into a fine state;
    mixing water in a ratio of 50 to 75 percent by weight to the ground oat hulls;
    adjusting the temperature of the oat hull-water mixture to 50 to 100 degrees F.,
    mixing amylase enzyme in a ratio of .3 to 2.7 percent by weight with the oat hull-water mixture;
    mixing the enzyme-oat hull-water mixture for approximately one hour while maintaining the temperature thereof in the range of 65–90 degrees F., baking the oat hull-water-amylase enzyme mixture at a temperature range of 230° to 320° F. for approximately 30 to 45 minutes;

mixing the baked mixture with a preheated and premixed water and molasses mixture;

stirring the entire mass for approximately 20 minutes; and drying the stirred mass.

7. The process of preparing an animal feed, comprising the following steps:

grinding oat hulls into a fine state;

mixing water in a ratio of 50 to 75 percent by weight to the ground oat hulls;

adjusting the temperature of the oat hull-water mixture to 50 to 100 degrees F., mixing yeast in a ratio of .3 to 2.7 percent by weight with the oat hull-water mixture, mixing the yeast-oat hull-water mixture for approximately one hour while maintaining the temperature thereof in the range of 65–90 degrees F., baking the oat hull-water-yeast mixture at a temperature range of 230° to 320° F. for approximately 30 to 45 minutes;

grinding the baked mixture;

mixing water and molasses with the baked oat hulls at a ratio of 43.1 percent to 94.5 percent water and 103.4 percent to 243.2 percent molasses by weight of the baked oat hulls, stirring the entire mass for approximately 20 minutes; and drying the stirred mass until the mass has a moisture content of .5 to 5.0 percent.

8. The process of preparing an animal feed, comprising the following steps:

grinding oat hulls into a fine state;

mixing water in a ratio of 50 to 75 percent by weight to the ground oat hulls;

adjusting the temperature of the oat hull-water mixture to 50 to 100 degrees F., mixing catalase enzyme in a ratio of .3 to 2.7 percent by weight with the oat hull-water mixture, mixing the enzyme-oat hull-water mixture for approximately one hour while maintaining the temperature thereof in the range of 65–90 degrees F., baking the oat hull-water-catalase enzyme mixture at a temperature range of 230° to 320° F. for approximately 30 to 45 minutes;

grinding the baked mixture;

mixing water and molasses with the baked oat hulls at a ratio of 43.1 percent to 94.5 percent water and 103.4 percent to 243.2 percent molasses by weight of the baked oat hulls, stirring the entire mass for approximately 20 minutes; and drying the stirred mass until the mass has a moisture content of .5 to 5.0 percent.

9. The process of preparing an animal feed, comprising the following steps:

grinding oat hulls into a fine state;

mixing water in a ratio of 50 to 75 percent by weight to the ground oat hulls;

adjusting the temperature of the oat hull-water mixture to 50 to 100 degrees F., mixing cellulase enzyme in a ratio of .3 to 2.7 percent by weight with the oat hull-water mixture.

mixing the enzyme-oat hull-water mixture for approximately one hour while maintaining the temperature thereof in the range of 65–90 degrees F., baking the oat hull-water-cellulase enzyme mixture at a temperature range of 230° to 320° F. for approximately 30 to 45 minutes;

grinding the baked mixture;

mixing water and molasses with the baked oat hulls at a ratio of 43.1 percent to 94.5 percent water and 103.4 percent to 243.2 percent molasses by weight of the baked oat hulls, stirring the entire mass for approximately 20 minutes; and drying the stirred mass until the mass has a moisture content of .5 to 5.0 percent.

10. The process of preparing an animal feed, comprising the following steps:

grinding oat hulls into a fine state;

mixing water in a ratio of 50 to 75 percent by weight to the ground oat hulls;

adjusting the temperature of the oat hull-water mixture to 50 to 100 degrees F., mixing amylase enzyme in a ratio of .3 to 2.7 percent by weight with the oat hull-water mixture, mixing the enzyme-oat hull-water mixture for approximately one hour while maintaining the temperature thereof in the range of 65–90 degrees F., baking the oat hull-water-amylase enzyme mixture at a temperature range of 230° to 320° F. for approximately 30 to 45 minutes;

grinding the baked mixture;

mixing water and molasses with the baked oat hulls at a ratio of 43.1 percent to 94.5 percent water and 103.4 percent to 243.2 percent molasses by weight of the baked oat hulls, stirring the entire mass for approximately 20 minutes; and drying the stirred mass until the mass has a moisture content of .5 to 5.0 percent.

11. The process of preparing an animal feed, comprising the following steps:

grinding oat hulls into a fine state;

mixing water in a ratio of 50 to 75 percent by weight to the ground oat hulls for approximately 10 to 20 minutes;

adjusting the temperature of the mixture to 70° to 80° F.;

mixing yeast in a ratio of .3 to 2.7 percent by weight with the oat hull-water mixture;

mixing the yeast-oat hull-water mixture for approximately one hour while maintaining the temperature in the range of 65–90 degrees F., baking the yeast-oat hull-water mixture at a temperature range of 230° to 320° F. for approximately 30 to 45 minutes;

mixing water and molasses with the baked mixture and mixing the mass for approximately 20 minutes and drying the mass.

12. The process of claim 11 wherein said water and molasses are mixed with the baked mixture for approximately 20 minutes and the mass is dryed until the mass has a moisture content of .5 to 5.0 percent.

13. The process of claim 11 wherein the water and molasses are mixed with the baked mixture at a ratio of 43.1 percent to 94.5 percent water and 103.4 percent to 243.2 percent molasses by weight of the baked oat hulls.

References Cited

UNITED STATES PATENTS

| | | | |
|---|---|---|---|
| 1,627,921 | 5/1927 | Miner et al. | 99—10 |
| 2,904,435 | 9/1959 | Kruse | 99—2 |

FOREIGN PATENTS 206,996  12/1955  Australia.

A. LOUIS MONACELL, *Primary Examiner.*

J. M. HUNTER, *Assistant Examiner.*